(12) United States Patent
Maeda et al.

(10) Patent No.: US 8,118,965 B2
(45) Date of Patent: Feb. 21, 2012

(54) MANUFACTURING METHOD FOR VARIABLE SHAPE MIRROR

(75) Inventors: Shigeo Maeda, Osaka (JP); Katuhiko Tanaka, Shiga (JP); Akira Ishii, Shiga (JP); Susumu Sugiyama, Shiga (JP)

(73) Assignee: Funai Electric Co., Ltd., Osaka (JP)

( * ) Notice: Subject to any disclaimer, the term of this patent is extended or adjusted under 35 U.S.C. 154(b) by 369 days.

(21) Appl. No.: 11/889,068

(22) Filed: Aug. 8, 2007

(65) Prior Publication Data

US 2008/0037149 A1 Feb. 14, 2008

(30) Foreign Application Priority Data

Aug. 9, 2006 (JP) .................. 2006-216675

(51) Int. Cl.
*G02B 7/182* (2006.01)
(52) U.S. Cl. ........................ 156/278; 359/849
(58) Field of Classification Search ............ 359/846, 359/849; 156/278
See application file for complete search history.

(56) References Cited

U.S. PATENT DOCUMENTS

| 3,904,274 A * | 9/1975 | Feinleib et al. ............... 359/295 |
| 4,655,563 A | 4/1987 | Plante et al. .................. 310/611 |
| 4,934,803 A * | 6/1990 | Ealey ............................ 359/845 |
| 4,940,318 A | 7/1990 | Ealey et al. |
| 5,719,846 A * | 2/1998 | Matoba et al. ............ 369/112.29 |
| 6,464,363 B1 * | 10/2002 | Nishioka et al. .............. 359/846 |
| 2002/0063496 A1 * | 5/2002 | Forck et al. .................... 310/332 |
| 2007/0002473 A1 | 1/2007 | Nagashima et al. .......... 359/849 |

FOREIGN PATENT DOCUMENTS

| JP | 05-333274 A1 | 12/1993 |
| JP | A-2004-109769 | 4/2004 |
| JP | A-2004-226457 | 8/2004 |
| WO | WO 93/25929 | 12/1993 |
| WO | WO 2005/040885 A2 | 5/2005 |

* cited by examiner

*Primary Examiner* — Katarzyna Wyrozebski Lee
*Assistant Examiner* — Daniel Lee
(74) *Attorney, Agent, or Firm* — Morgan, Lewis & Bockius LLP

(57) ABSTRACT

A manufacturing method for variable shape mirrors, which is suitable for mass production, includes a bonding step for sandwiching support pillars and piezoelectric elements between a support substrate and a mirror substrate, and bonding at least the support substrate and the support pillar to each other, the support substrate and the piezoelectric element to each other, and the mirror substrate and the support pillars to each other, respectively, and an elastic film forming step for forming a flat elastic film on the outer surface of the mirror substrate, and a reflection film forming step for forming a reflection film on the elastic film.

6 Claims, 4 Drawing Sheets

MANUFACTURING METHOD FOR VARIABLE SHAPE MIRROR

This application is based on Japanese Patent Application No. 2006-216675 filed on Aug. 9, 2006, and the contents of which are hereby incorporated by reference.

BACKGROUND OF THE INVENTION

1. Field of the Invention

The present invention relates to a manufacturing method for a variable shape mirror that is mounted on an optical pickup device.

2. Description of Related Art

Conventionally, a compact discs (CD) and a digital versatile disc (DVD) are available in the market as an optical recording medium for recording information such as images and sounds. Further, in recent years, a next-generation DVD are being commercialized, which uses a laser beam of violet color having a short wavelength for realizing higher density recording. In order to use such an optical disc, an optical disc apparatus is necessary as a driving apparatus. The optical disc apparatus drives the optical disc to rotate and leads the laser beam onto a recording surface of the optical disc, so that information is recorded or erased and that information is reproduced based on reflection light from the recording surface. Further, in order to realize such a function, the optical disc apparatus is equipped with an optical pickup device as a set of units for emitting the laser beam, leading the laser beam onto the recording surface of the optical disc to form a beam spot, and receiving reflection light from the recording surface of the optical disc.

Here, optical pickup devices, particularly next-generation DVDs are adapted to a high numerical aperture (NA) in accordance with a standard to conform. In this case, influence of the spherical aberration that is generated when a thickness of the optical disc varies slightly becomes conspicuous so that a minute beam spot may not be obtained. Therefore, jitter of a reproduced signal is deteriorated, and recording peak power is lowered, so that recording and reproducing quality is lessened as a result.

In addition, the optical axis of the laser beam may be inclined slightly with respect to the recording surface resulting from warpage or the like of the optical disc. In this case, the optical path of the laser beam is bent so that coma aberration is generated, which makes it difficult to condense the laser beam into an appropriate spot diameter. As a result, recording and reproducing quality is deteriorated. There are other factors of deterioration of recording and reproducing quality, which includes positioning accuracy of an optical system such as an optical lens or a beam splitter that is an element of the optical pickup device, which causes astigmatic aberration.

In order to prevent the above-mentioned situation, there is proposed a variable shape mirror that can correct wave aberration such as the spherical aberration. For example, as shown in FIG. 4, the optical pickup device adopting a variable shape mirror 1 in the optical system is made up of a semiconductor laser 12, a collimator lens 13, a beam splitter 14, the variable shape mirror 1, a quarter wave length plate 15, an objective lens 16, a condensing lens 17, a photo detector 18 and the like. A laser beam emitted from the semiconductor laser 12 is made into parallel rays by the collimator lens 13, passes through the beam splitter 14, is reflected by the variable shape mirror 1 after its polarized state is changed by the quarter wave length plate 15, and is condensed by the objective lens 16 so as to reach the recording surface of the optical disc D.

Further, the laser beam reflected by the recording surface of the optical disc D passes through the objective lens 16, is reflected by the variable shape mirror 1, passes through the quarter wave length plate 15, then is reflected by the beam splitter 14 this time, and is condensed by the condensing lens 17 so as to reach the photo detector 18 at last.

The variable shape mirror 1 has a function of a so-called rise up mirror that reflects the laser beam toward the optical disc D and reflects the reflection light from the optical disc D in parallel with the optical disc D. It also has a function of changing its reflection plane if necessary for fine adjustment of a reflection angle of the laser beam, so that wave aberration is corrected. In this case, based on a signal obtained by the photo detector 18, if it is necessary to correct wave aberration, a control portion that is provided to the optical pickup device sends a signal to the variable shape mirror 1 so that a shape of the reflection plane is changed for correcting the aberration.

As to the variable shape mirror 1, there is a type that utilizes characteristics of a piezoelectric element made of a piezoelectric material (see JP-A-2004-109769 and JP-A-2004-226457, for example). This variable shape mirror 1 is generally made up of a support substrate, a mirror substrate that is supported by a support pillar and is opposed to the support substrate, and a piezoelectric element sandwiched between the support substrate and the mirror substrate. The outer surface of the mirror substrate is provided with a reflection film to be a reflection plane for the laser beam. When a predetermined voltage is applied to the piezoelectric element so that an electric field is applied, the piezoelectric element is expanded or contracted between the support substrate and the mirror substrate. The mirror substrate is deformed elastically in accordance with the expansion or the contraction, the reflection film, i.e., the reflection plane is deformed following the deformation of the mirror substrate.

Under the present circumstances, a manufacturing method for such a variable shape mirror that is suitable for mass production is not established yet. For example, in the current situation, the support substrate and the mirror substrate that constitute each variable shape mirror are cut from the wafers, and the support pillar and the piezoelectric element are sandwiched between the support substrate and the mirror substrate. Then, the both wafers and the support pillar, as well as the both wafers and the piezoelectric element are bonded to each other, individually. Then, the reflection film is formed on the outer surface of the mirror substrate. Thus, the variable shape mirror can be obtained at least.

However, according to this method, distortion will occur in the mirror substrate in many cases, caused by local residual stresses that are generated at a bonded section between the mirror substrate and the support pillar, and at a bonded section between the mirror substrate and the piezoelectric element. If the mirror substrate has distortion, the reflection film that is formed on the outer surface thereof also has distortion, so an appropriate reflection plane cannot be obtained. In this case, yield of the obtained variable shape mirrors is reduced, so the method is not suitable for mass production.

SUMMARY OF THE INVENTION

In view of the above described problem, it is an object of the present invention to provide a manufacturing method for variable shape mirrors, which is suitable for mass production.

To attain the above described object, a manufacturing method in accordance with a first aspect of the present invention for variable shape mirrors, each of the variable shape mirrors including: a support substrate; a mirror substrate that is opposed to the support substrate and is supported by support pillars and has a reflection film on the surface; and piezoelectric elements that are sandwiched between the support substrate and the mirror substrate and are expanded or contracted when an electric field is applied so as to deform the mirror substrate and the reflection film, and the manufacturing method is characterized by including: a bonding step for sandwiching the support pillars and the piezoelectric elements between the support substrate and the mirror substrate, and bonding at least the support substrate and the support pillar to each other, the support substrate and the piezoelectric element to each other, and the mirror substrate and the support pillars to each other, respectively; an elastic film forming step for forming a flat elastic film on the outer surface of the mirror substrate; and a reflection film forming step for forming the reflection film on the elastic film.

According to this structure, a reflection film is formed on the outer surface of the flat elastic film that is formed on the outer surface of the mirror substrate. Therefore, the reflection plane of the reflection film also becomes flat, so that a variable shape mirror having good quality can be obtained securely.

In a manufacturing method in accordance with a second aspect of the present invention it is preferable that the elastic film is made of a resin.

In a manufacturing method in accordance with a third aspect of the present invention it is preferable that thin metal layers are disposed at bonding portions between the support substrate and the support pillars, and the bonding portions between the support substrate and the piezoelectric elements, and they are pressed to each other while they are heated so as to be bonded.

In a manufacturing method in accordance with a fourth aspect of the present invention it is preferable that thin metal layers are disposed at bonding portions between the mirror substrate and the support pillars, and the bonding portions between the mirror substrate and the piezoelectric elements, and they are pressed to each other while they are heated so as to be bonded.

According to the manufacturing method for variable shape mirrors of the present invention, a variable shape mirror having good quality can be obtained securely, and the method is suitable for mass production.

DETAILED DESCRIPTION OF THE PREFERRED EMBODIMENTS

Figure 1A:
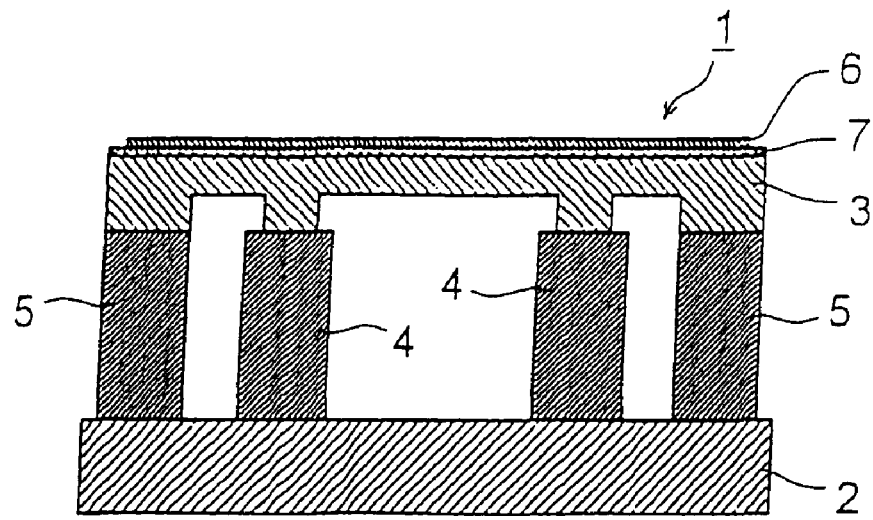
FIGS. 1A and 1B are cross sectional views of a variable shape mirror that is manufactured by a manufacturing method according to an embodiment of the present invention.
Figure 1B:
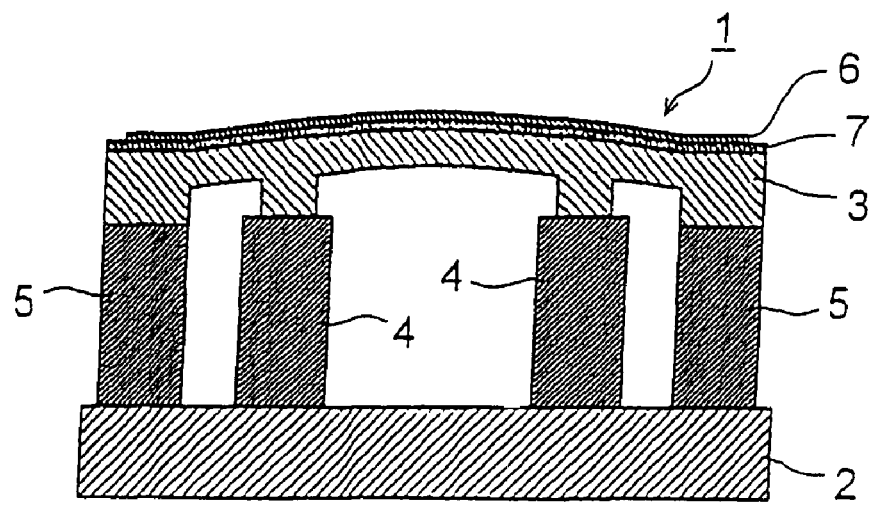
Figure 2:
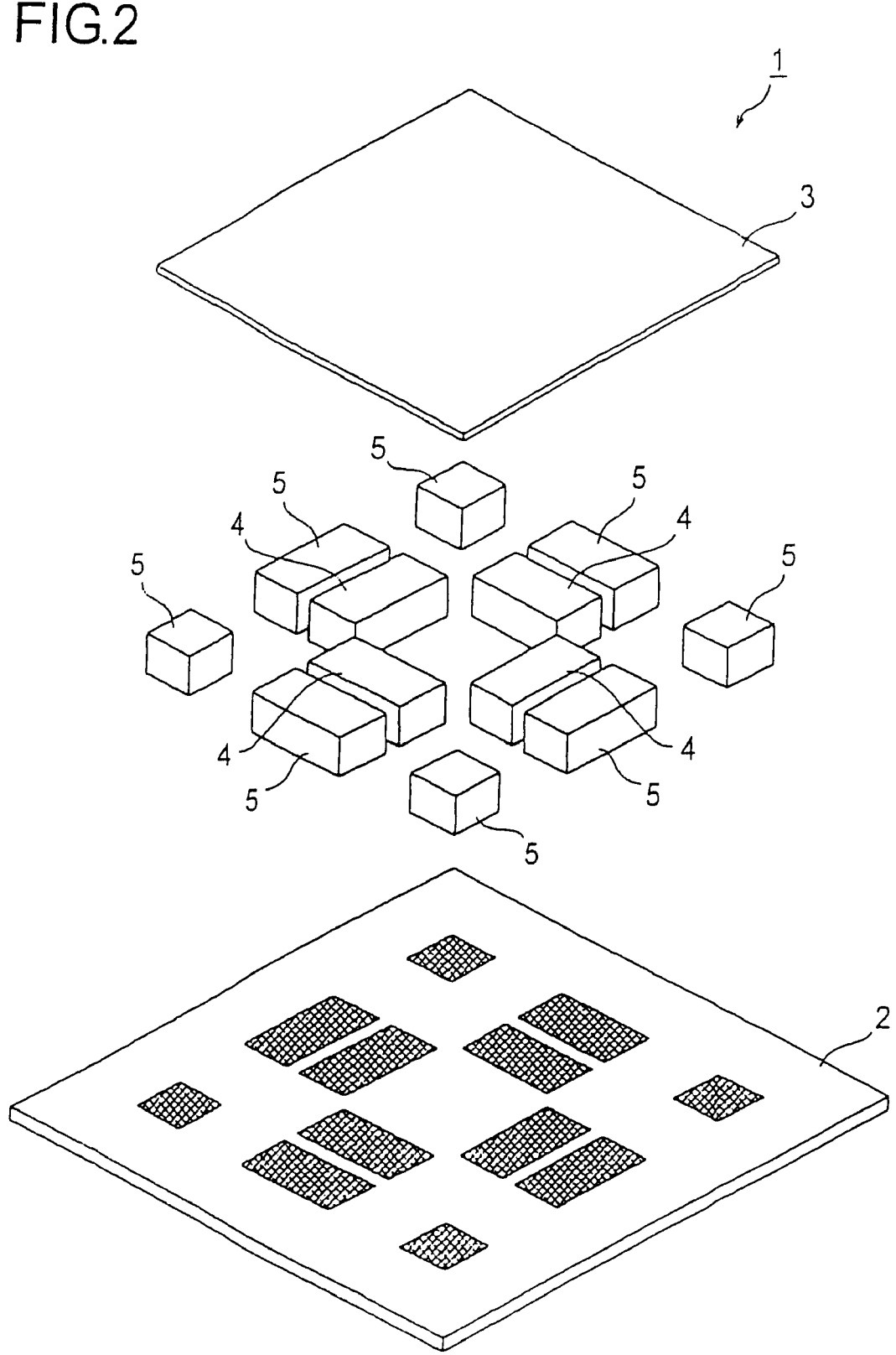
FIG. 2 is an exploded perspective view of the variable shape mirror to show its general structure.

Hereinafter, an embodiment of the present invention will be described in detail with reference to the attached drawings. FIGS. 1A and 1B are cross sectional views of a variable shape mirror that is manufactured by a manufacturing method according to an embodiment of the present invention. FIG. 1A shows an undriven state, while FIG. 1B shows a driven state. FIG. 2 is a an exploded perspective view of the variable shape mirror to show its general structure and FIG. 3A-3D are cross sectional views of the variable shape mirror to show a procedure of the manufacturing method for variable shape mirrors according to an embodiment of the present invention.

First, a variable shape mirror 1 will be described. As shown in FIGS. 1A and 2, the variable shape mirror 1 in the present embodiment includes a support substrate 2 having a substantially square shape, a mirror substrate 3 that has a substantially square shape of a little smaller size than the support substrate 2 and is opposed to the support substrate 2, a plurality of piezoelectric elements 4 and a plurality of support pillars 5 that are sandwiched between the support substrate 2 and the mirror substrate 3 at predetermined positions. The variable shape mirror 1 of this embodiment includes the support pillars 5 disposed at four corners and at substantially centers of four sides of the mirror substrate 3 as shown in FIG. 2, and the piezoelectric elements 4 are disposed inside the support pillars 5 disposed at four sides with a predetermined space. In other words, the piezoelectric elements 4 and the support pillars 5 are disposed in this order outward from the center of the mirror substrate 3 in the cross direction.

The support substrate 2 is a base for supporting individual components. As a material of the support substrate 2, glass can be used. However, other materials as long as having insulation characteristics, such as ceramics, can also be used. This support substrate 2 is provided with a thin film portion made of silicon (Si) that is formed on the surface facing the mirror substrate 3 (i.e., the inner surface) at the positions where the piezoelectric elements 4 and the support pillars 5 are disposed (hatched portions in FIG. 2). In particular, a wiring pattern (not shown) made of the same Si is lead out to a vicinity to the edge of the support substrate 2 from the Si thin film portion of the position where the piezoelectric element 4 are disposed. Note that the Si thin film portions and the Si wiring patterns are formed by photo lithography or the like.

The mirror substrate 3 is a plate that is capable of being deformed in an elastic manner. As a material of it, Si can be used. However, glass or the like, for example, can also be used as long as it can be deformed in an elastic manner. This mirror substrate 3 is provided with an elastic film 7 that has a function as a reflection plane that is formed on the substantially entire surface (outer surface) opposite to the surface (inner surface) facing the support substrate 2. As a material of the elastic film 7, a resin of an epoxy system or a polyimide system or the like can be used. However, the material is not limited as long as it can be deformed in an elastic manner. This elastic film 7 is provided with a reflection film 6 that has a function as a reflection plane that is formed on the substantially entire surface. The reflection film 6 is a metal film made of aluminum (Al) or the like, which is formed by vapor deposition or sputtering or the like.

The piezoelectric element 4 is formed in a rectangular solid shape made of a piezoelectric material that is expanded or contracted when an electric field is applied. As the material, PZT (Pb(Zr,Ti)O3, lead zirconate titanate) can be used. However, it can be other piezoelectric ceramics except the PZT or piezoelectric polymer such as a polyvinylidene fluoride or the like. Note that the shape of the piezoelectric element 4 can be a cylindrical shape or a rectangular column shape.

Each of the piezoelectric elements 4 is bonded onto the Si thin film portion formed on the inner surface of the support substrate 2 via a metal thin layer portion (not shown). As a material of the thin metal layer portion, Au (gold) can be used, and the thin metal layer portion is formed on the Si thin film portion on the inner surface of the support substrate 2 by vapor deposition or sputtering or the like. However, the thin metal layer portion can be made of not only Au but also Pt (platinum) or the like. In this embodiment, the support substrate 2 and each of the piezoelectric elements 4 are pressed to each other while they are heated, so that metal (Au) atoms of the thin metal layer portion between them are diffused into the Si thin film portion on the inner surface of the support substrate 2 and into the piezoelectric element 4 (PZT). Thus, the support substrate 2 and each of the piezoelectric elements 4 are bonded securely in a diffused junction.

In the same way, the mirror substrate 3 is bonded onto each of the piezoelectric elements 4 via a thin metal layer portion (not shown) by the diffused junction. The thin metal layer portion is formed on the inner surface of the mirror substrate 3 by vapor deposition or sputtering or the like.

Thus, in the present embodiment, the Si thin film portion on the inner surface of the support substrate 2 is connected electrically to each of the piezoelectric elements 4 via the thin metal layer portion so as to be a separated electrode for applying an electric field to each of the piezoelectric elements 4. On the other hand, the mirror substrate 3 made of Si is connected electrically to each of the piezoelectric elements 4 via the thin metal layer portion so as to be a common electrode for applying an electric field to each of the piezoelectric elements 4.

Although the thin metal film portion is used as a type of adhesive for bonding the support substrate 2 and the piezoelectric element 4 to each other, and for bonding the mirror substrate 3 and the piezoelectric element 4 to each other by the diffused junction in the present embodiment, it is possible to use a conductive adhesive for bonding them. In addition, it is possible to use a nonconductive adhesive of epoxy system or the like for bonding them, but in this case, it is necessary to make electric connection between the Si wiring pattern from the Si thin film portion on the inner surface of the support substrate 2 and the piezoelectric element 4, and between the mirror substrate 3 made of Si and the piezoelectric element 4 by additional wire bonding or the like. In addition, it is possible to make electric connection between the mirror substrate 3 and the piezoelectric element 4 not by the junction but by contact.

Although the mirror substrate 3 and the piezoelectric element 4 are bonded to each other in the present embodiment, it is possible to use a laminated piezoelectric element with electrodes drawn out from both sides can be used as the piezoelectric element 4, for example. In this case, if the Si thin film portion on the inner surface of the support substrate 2 is divided into two parts so that each of the Si thin film portions is connected to each electrode of the laminated piezoelectric element, an electric field can be applied to each of the piezoelectric elements 4. Therefore, it is sufficient to make a simple contact state between the mirror substrate 3 and the piezoelectric element 4 without bonding them to each other.

The support pillar 5 supports the mirror substrate 3. The support pillar 5 in the present embodiment is made of the same material as the piezoelectric element 4 and is bonded to the support substrate 2 and the mirror substrate 3 in the same manner as the above-mentioned piezoelectric element 4. Although the support pillar 5 is formed separately from the support substrate 2 in the present embodiment, it is possible to form it integrally with the support substrate 2.

As to the variable shape mirror 1 having the structure described above, the reflection plane of the mirror substrate 3 of the reflection film 6 is flat as shown in FIG. 1A, in the undriven state, i.e., the state where a voltage is not applied to each of the piezoelectric elements 4. On the other hand, when a predetermined voltage is applied to each of the piezoelectric elements 4 so that an electric field is applied for driving, each of the piezoelectric elements 4 is expanded between the support substrate 2 and the mirror substrate 3 as shown in FIG. 1B. In accordance with the expansion, the mirror substrate 3 is pressed upward so as to be deformed elastically in a convex shape, and the reflection plane of the reflection film 6 is deformed following the deformation of the mirror substrate 3. Therefore, use of this variable shape mirror 1 in the optical system of the optical pickup device enables correction of wave aberration in the laser beam.

Figure 3A:
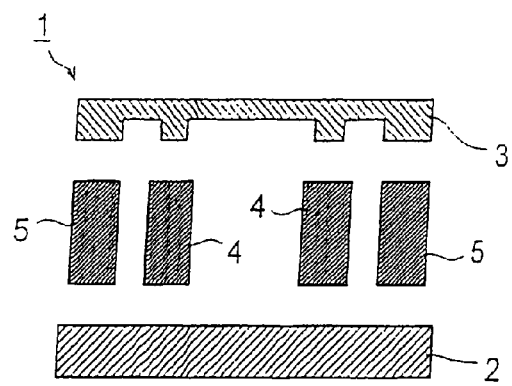
FIGS. 3A-3D are cross sectional views of the variable shape mirror to show a procedure of the manufacturing method for variable shape mirrors according to an embodiment of the present invention.

Next, a manufacturing method for the above-mentioned variable shape mirror will be explained. First, as shown in FIG. 3A, the support substrate 2, the mirror substrate 3, the piezoelectric elements 4, and the support pillars 5 that are individual elements of the variable shape mirror 1 are prepared. For example, the support substrate 2 and the mirror substrate 3 are cut out from each wafer and are prepared. Note that in the present embodiment the Si thin film portion, the Si wiring pattern and the thin metal layer portion that are described above as the structure of the variable shape mirror 1 are formed on a surface of the support substrate 2, while the thin metal layer portion is formed on a surface of the mirror substrate 3.

Figure 3B:
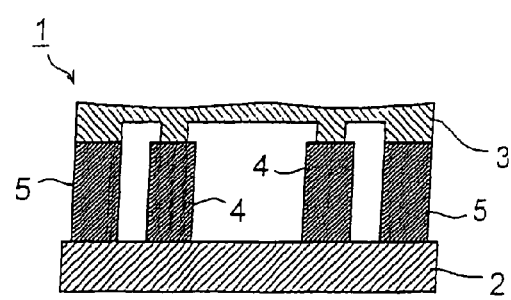

Next, as shown in FIG. 3B, the support substrate 2 and the mirror substrate 3 are arranged so that the surface of the support substrate 2 on which the Si thin film portions and the like are formed and the surface of the mirror substrate 3 on which the thin metal layer portions are formed face each other. Here, the support pillars 5 and the piezoelectric elements 4 are sandwiched between the support substrate 2 and the mirror substrate 3, so as to bond the support substrate 2 and the support pillars 5, the support substrate 2 and the piezoelectric elements 4, the mirror substrate 3 and the support pillars 5, and the mirror substrate 3 and the piezoelectric elements 4 to each other, respectively. In the present embodiment, the support substrate 2 and the support pillars 5, the support substrate 2 and the piezoelectric elements 4, the mirror substrate 3 and the support pillars 5, and the mirror substrate 3 and the piezoelectric elements 4 are pressed to each other while they are heated, so that the support substrate 2 and the support pillars 5, the support substrate 2 and the piezoelectric elements 4, the mirror substrate 3 and the support pillars 5, and the mirror substrate 3 and the piezoelectric elements 4 are bonded securely to each other by the diffused junction. Note that the mirror substrate 3 and the piezoelectric elements 4 may be just contacted with each other without bonding.

In this way, after bonding the support substrate 2, the mirror substrate 3, the piezoelectric elements 4 and the support pillars 5, local residual stress may occur at the bonding portions between the mirror substrate 3 and the support pillars 5, and between the mirror substrate 3 and the piezoelectric elements 4. Due to the residual stress mainly, distortion may occur in the mirror substrate 3 so that the mirror substrate 3 becomes a state waving slightly. FIG. 3B shows the state with exaggeration. If the mirror substrate 3 remains in the distortion, the reflection film 6 formed on the outer surface thereof also has distortion, so an appropriate flat reflection plane cannot be obtained. In the present embodiment, such a distortion is canceled by the following steps.

Figure 3C:
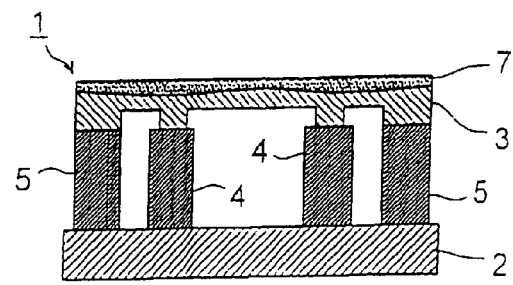

As shown in FIG. 3C, the flat elastic film 7 is formed so as to cover the entire outer surface of the mirror substrate 3. In the present embodiment, resin is used as the elastic film 7, and the flat elastic film 7 having a flat outer surface is formed on the outer surface of the mirror substrate 3 as follows. For example, the mirror substrate 3 is rotated at high speed and the resin is dropped on the outer surface of the mirror substrate 3 that is rotating, like a spin coat method. Alternatively, the resin is poured into a mold having a flat recess shape, and the mirror substrate 3 is placed on it from the outer surface. Then, the resin is released from the mold after the resin is cured. Alternatively, the resin is coated onto the outer surface of the mirror substrate 3, and the surface of the resin is heated up to a temperature above a glass transition point of the resin. In this state, a flat plate is pressed to the surface of the resin. There are many methods other than those described above.

Figure 3D:
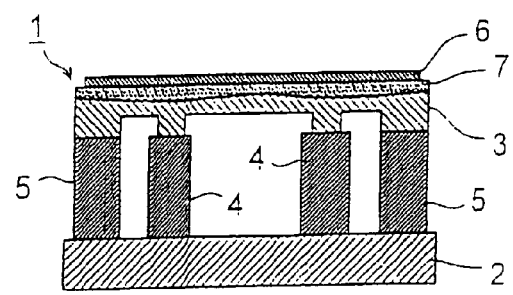
Figure 4:
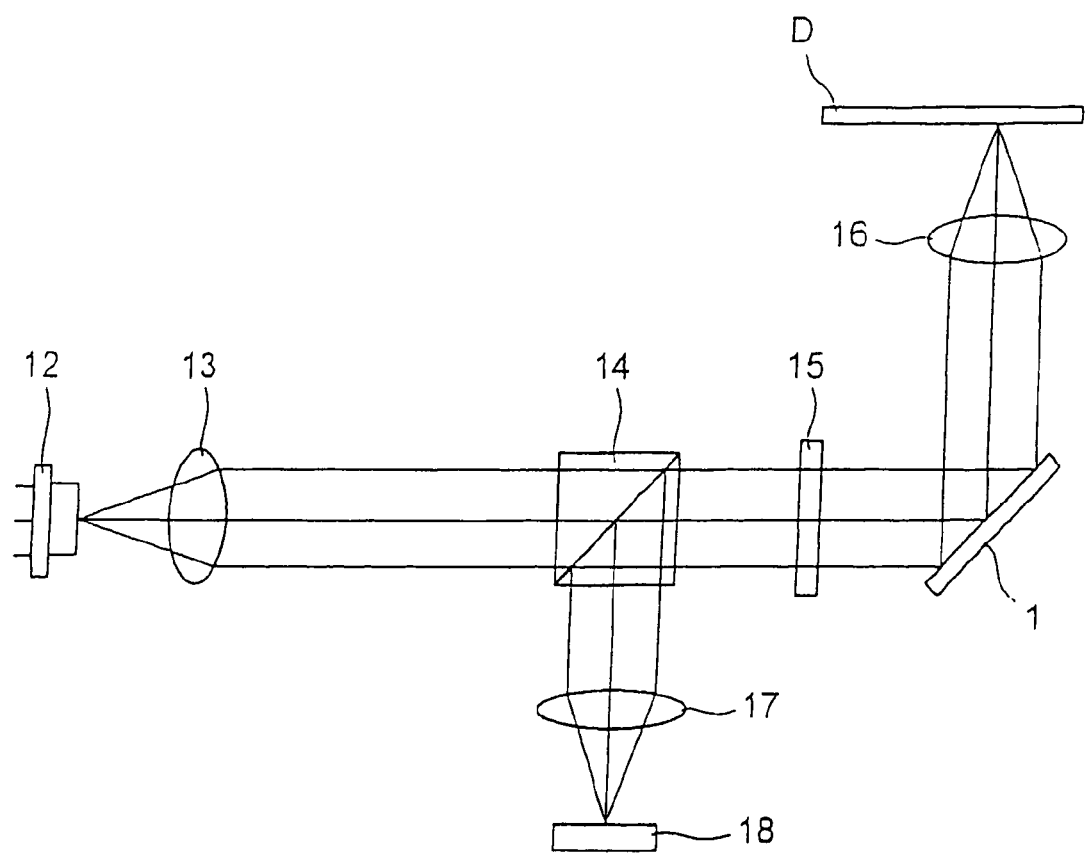
FIG. 4 is a plan view to show a general structure of an optical pickup device that adopts a variable shape mirror.

Then, as shown in FIG. 3D, the reflection film 6 is formed on the flat outer surface of the elastic film 7. In this way, the variable shape mirror 1 is obtained.

Since the variable shape mirror 1 obtained as described above has the reflection film 6 formed on the flat surface of the elastic film 7 on the outer surface of the mirror substrate 3, the surface of the reflection film 6 is also flat. Therefore, according to the manufacturing method of the present embodiment, the variable shape mirror 1 having good quality can be obtained securely. Accordingly, the manufacturing method of the present embodiment is sufficiently suitable for mass production.

Although the elastic film 7 and the reflection film 6 are individual members in the present embodiment, it is possible that they share the same member. More specifically, the elastic film 7 may be made of the same metal as the reflection film 6 on the outer surface of the mirror substrate 3 so as to have a thickness to some extent, and a flat grindstone may be pressed on the entire outer surface of the elastic film 7 so as to polish the same. Then, a flat reflection plane is formed as it is without forming the additional reflection film 6.

Furthermore, the present invention is not limited to the embodiment described above but can be embodied with various modification within the scope of the present invention without deviating from its spirit. For example, although the variable shape mirrors 1 are manufactured by using the support substrate 2 and the mirror substrate 3 in a chip level cut out from the wafer in advance in the embodiment described above, it is possible that individual variable shape mirrors 1 are assembled at the stage of the wafer, and then the wafer is divided into the individual variable shape mirrors 1.

In this case, wafers to be the support substrate 2 and the mirror substrate 3, respectively, are prepared, and the support pillars 5 and the piezoelectric elements 4 are sandwiched between the wafers, so that the wafers and the support pillars 5, and the wafers and the piezoelectric elements 4 are bonded to each other, respectively. Next, the elastic film 7 is formed on the outer surface of the wafer to be the mirror substrate 3. After that, each of the wafers is cut individual by a disc-shaped dicing saw along boundaries between the areas to be the individual variable shape mirrors 1, so that it is divided into the individual variable shape mirrors 1. Then, a reflection film 6 is formed on the outer surface of the mirror substrate 3 of each variable shape mirror 1.

Thus, a lot of variable shape mirrors 1 can be obtained at the same time, so manufacturing efficiency for the variable shape mirrors 1 is improved, and the method is more suitable for mass production. Note that this method enables the thin fragile wafer as the mirror substrate 3 to be reinforced by the elastic film 7, so it is possible to decrease damages to the wafer due to chipping or breaking when the wafer is cut by the dicing saw.

The manufacturing method of the present invention is suitable for the variable shape mirrors.

What is claimed is:

1. A manufacturing method for variable shape mirrors, each of the variable shape mirrors comprising:
    a support substrate;
    a mirror substrate that is opposed to the support substrate and is supported by support pillars and has a reflection film on the surface; and
    piezoelectric elements that are sandwiched between the support substrate and the mirror substrate and are expanded or contracted when an electric field is applied so as to deform the mirror substrate and the reflection film, and
the manufacturing method comprising:
    a bonding step for sandwiching the support pillars and the piezoelectric elements between the support substrate and the mirror substrate, and bonding at least the support substrate and the support pillar to each other, the support substrate and the piezoelectric element to each other, and the mirror substrate and the support pillars to each other, respectively;
    an elastic film forming step for forming a flat elastic film to cancel distortion which is generated in manufacturing step on the outer surface of the mirror substrate; and
    a reflection film forming step for forming the reflection film on the elastic film,
    wherein the elastic film forming step comprises a step of forming the elastic film out of resin by use of at least one of:
        a technique of dropping the resin onto the mirror substrate while the mirror substrate is rotating;
        a technique of pouring the resin into a mold having a flat recess shape, then placing thereon the mirror substrate from the outer surface, and then releasing the resin from the mold after the resin is cured; and
        a technique of coating the outer surface of the mirror substrate with the resin, then, with the surface of the resin heated up to a temperature above a glass transition point, pressing a flat plate onto the surface of the resin.

2. The manufacturing method for variable shape mirrors according to claim 1, wherein thin metal layers are disposed at bonding portions between the support substrate and the support pillars, and the bonding portions between the support substrate and the piezoelectric elements, and they are pressed to each other while they are heated so as to be bonded.

3. The manufacturing method for variable shape mirrors according to claim 2,
    wherein thin metal layers are disposed at bonding portions between the mirror substrate and the support pillars, and
    the bonding portions between the mirror substrate and the piezoelectric elements, and they are pressed to each other while they are heated so as to be bonded.

4. The manufacturing method for variable shape mirrors according to claim 1, wherein thin metal layers are disposed at bonding portions between the support substrate and the support pillars, and the bonding portions between the support substrate and the piezoelectric elements, and they are pressed to each other while they are heated so as to be bonded.

5. The manufacturing method for variable shape mirrors according to claim 1, wherein thin metal layers are disposed at bonding portions between the mirror substrate and the support pillars, and the bonding portions between the mirror substrate and the piezoelectric elements, and they are pressed to each other while they are heated so as to be bonded.

6. The manufacturing method for variable shape mirrors according to claim 1, wherein thin metal layers are disposed at bonding portions between the mirror substrate and the support pillars, and the bonding portions between the mirror substrate and the piezoelectric elements, and they are pressed to each other while they are heated so as to be bonded.

* * * * *